United States Patent [19]

Hartkopf

[11] 4,234,288
[45] Nov. 18, 1980

[54] APPARATUS FOR TRANSPORTING ELONGATED CYLINDRICAL WORKPIECES

[75] Inventor: Heinz Hartkopf, Solingen, Fed. Rep. of Germany

[73] Assignee: Th. Kieserling & Albrecht, Solingen, Fed. Rep. of Germany

[21] Appl. No.: 569

[22] Filed: Jan. 2, 1979

[30] Foreign Application Priority Data

Jan. 9, 1978 [DE] Fed. Rep. of Germany ....... 2800694

[51] Int. Cl.³ ............................................. B65G 35/02
[52] U.S. Cl. .................................... 414/745; 198/725
[58] Field of Search ............... 198/429, 457, 485, 717, 198/725, 809; 414/89, 745, 748

[56] References Cited

U.S. PATENT DOCUMENTS

| | | | |
|---|---|---|---|
| 3,406,838 | 10/1968 | Davidson | 414/748 |
| 3,481,447 | 12/1969 | Kochalski et al. | 198/429 |
| 3,648,823 | 3/1972 | Neer | 198/725 |
| 3,844,420 | 10/1974 | Walling et al. | 414/745 |

Primary Examiner—Jeffrey V. Nase
Attorney, Agent, or Firm—Edward E. Sachs

[57] ABSTRACT

Elongated cylindrical workpieces are transported by gripping same between a driven belt and a supporting surface. The belt imparts rotation to the workpieces for rolling same along the supporting surface.

13 Claims, 4 Drawing Figures

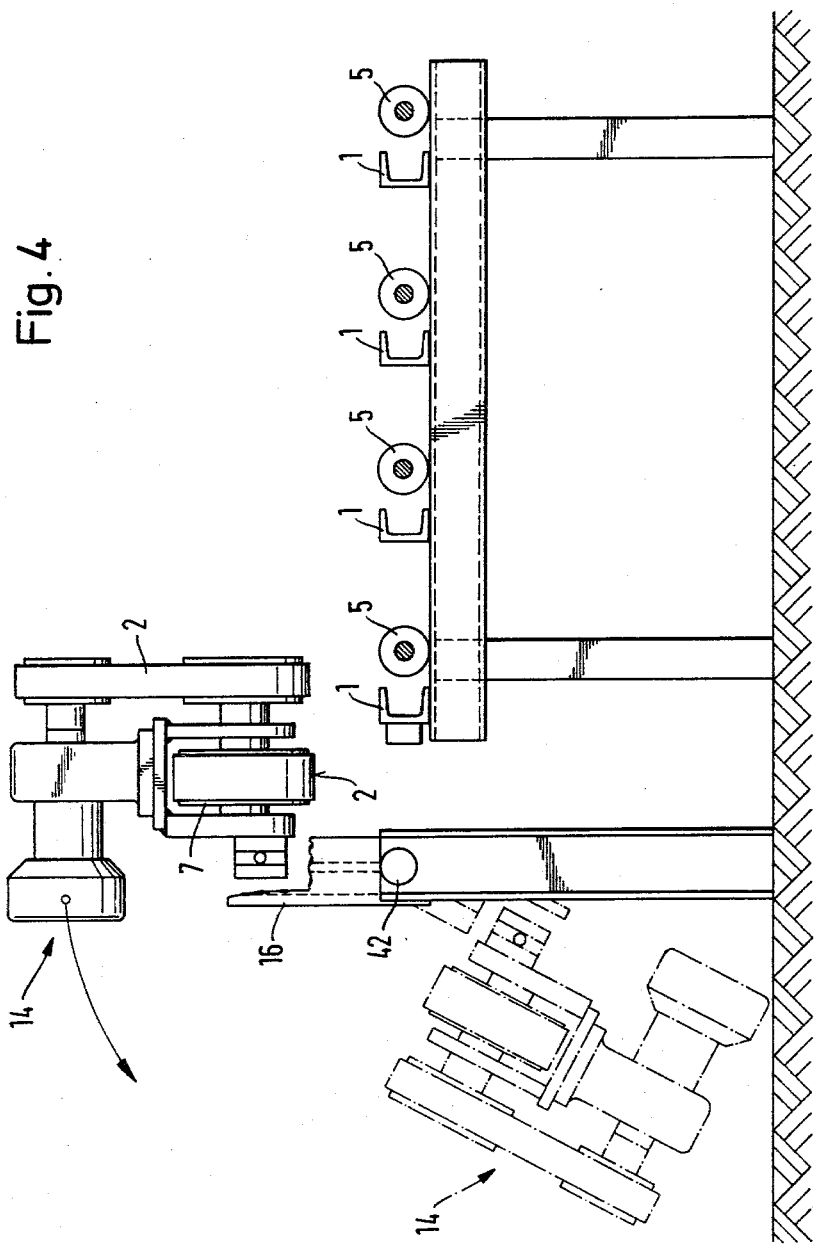

APPARATUS FOR TRANSPORTING ELONGATED CYLINDRICAL WORKPIECES

The invention relates generally to transportation of elongated cylindrical workpieces such as pipes or rods and, more particularly, to transportation of such workpieces by rolling same along a supporting surface.

It is common to transport elongated generally cylindrical workpieces by positively carrying them from one position to another. The workpieces are frequently clamped between movable jaws or are effectively clamped by the force of gravity holding them within V-blocks or the like. Apparatus for positively transporting pipes and rods include oscillating racks, conveyor worms and chains with or without driving lugs. Apparatus of this type positively carry the pipes or rods in a direction perpendicular to their length. Known apparatus of the type described is very complicated and requires matching to the length of the workpieces. In addition, the surface or conveying devices along which the workpieces are carried cannot be used for other purposes such as storage.

It is therefore the primary object of the present invention to provide an apparatus and method for transporting elongated generally cylindrical pipes or rods in a more simplified manner.

It is a further object of the invention to provide an improved apparatus and method for conveying pipes or rods in such a manner that a workpiece supporting surface can be used for other purposes.

It is an additional object of the invention to provide an improved workpiece transporting apparatus which is relatively simple.

It is also an object of the invention to provide an improved apparatus and method for transporting elongated pipes or rods, and which aligns the ends of a plurality of workpieces at an output station.

An aspect of the present invention resides in positioning an elongated lower run of a flexible belt above a supporting surface in substantially parallel and spaced relationship thereto. Elongated generally cylindrical workpieces are gripped between the supporting surface and the lower belt run, and are rolled along the supporting surface by action of the belt.

In a preferred arrangement, the belt is preferably mounted on a mechanism which is adjustable toward and away from the supporting surface for accommodating workpieces of different diameters.

In accordance with another aspect of the apparatus, the belt drive and support mechanism is mounted for movement below the supporting surface so it is completey out of the way when it is desired to use the supporting surface for a storage table or the like.

The supporting surface is preferably provided with a movable support member which is positioned adjacent the lower belt run and spaced therebelow. The support member is movable toward and away from the lower belt run for firmly but yieldably gripping the workpiece between the lower belt run and the support member.

Transverse guides are provided for the lower belt run to maintain such run in a straight path.

With the apparatus of the present application, workpieces are transported between input and output stations, and pusher means is provided adjacent the output station for pushing on a workpiece end to align the corresponding ends of a plurality of workpieces at the output station. In addition, the pusher means moves each workpiece longitudinally beyond the movable support member.

A workpiece receiving trough is provided at the discharge station, and the trough has a vertically adjustable bottom and at least one laterally adjustable sidewall member for respectively varying the depth and width of the trough. The longitudinal axis of the trough is inclined at an angle of between 5°–10° to the axis of a workpiece entering the input station. The lower belt run extends substantially perpendicular to the trough axis.

For a better understanding of the present invention, together with other and further objects thereof, reference is had to the following description taken in connection with the accompanying drawings, and its scope will be pointed out in the appended claims.

In the drawings:

FIG. 4 is a rear elevational view of an apparatus similar to that shown in FIG. 1, and with a belt drive mechanism swingable to a lowered storage position.

Figure 1:
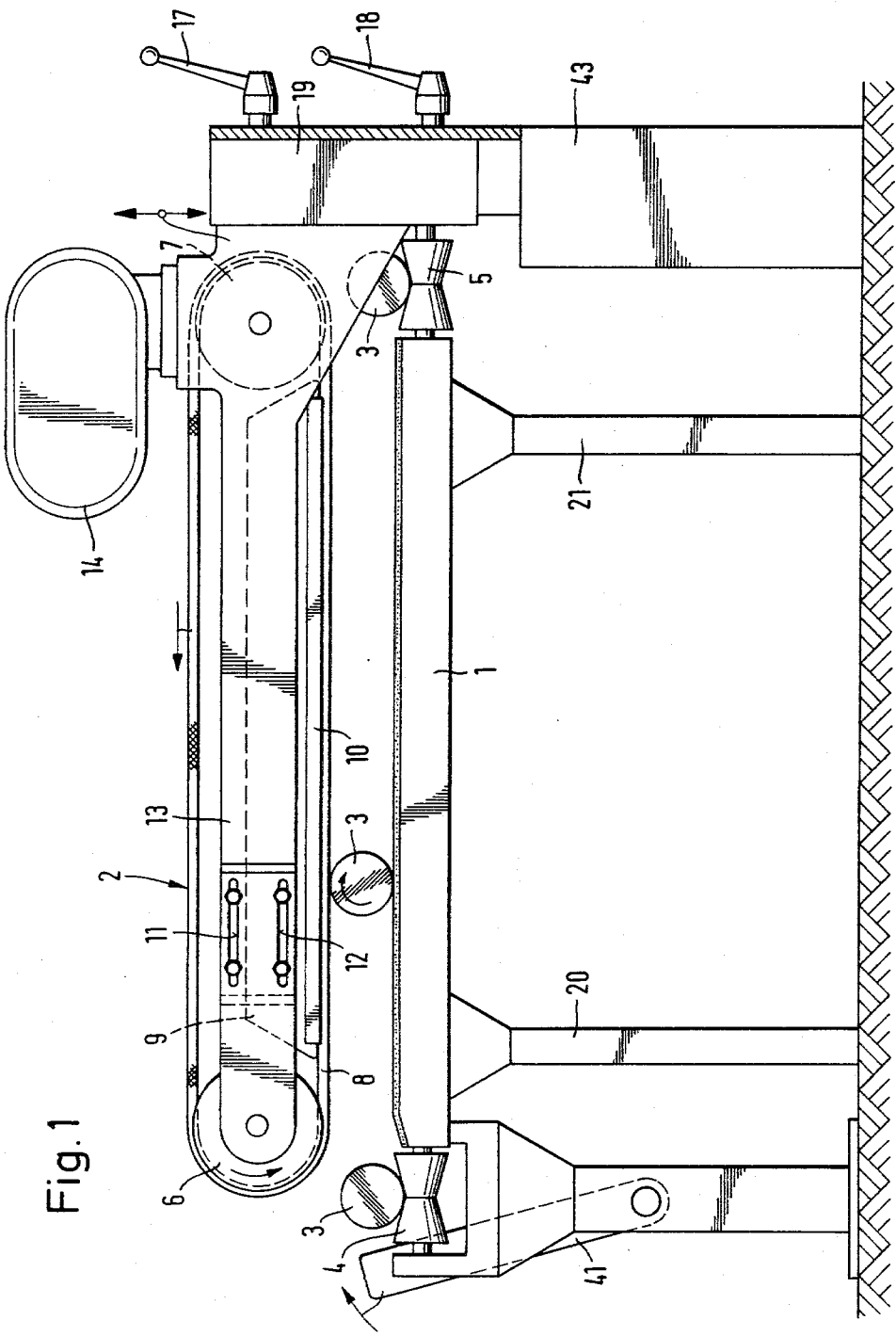
FIG. 1 is an end elevational view of a workpiece transporting apparatus constructed in accordance with the present invention.

Referring now to the drawing, and particularly FIG. 1, an apparatus for transporting elongated generally cylindrical workpieces includes a supporting surface 1 held in an elevated position by vertical supports 20, 21. An endless conveyor belt 2 extends around an idler roll 6 and a driven roll 7 operated by an electric motor 14.

The conveyor belt 2, along with its drive and supporting mechanism, is mounted on a column 43 positioned externally of the supporting surface 1 adjacent one end thereof. The belt drive and supporting mechanism is secured to a rail 19 which is adjustably held to the column 43 for adjusting the elevation of the belt drive and support mechanism. In one arrangement, the belt drive and support mechanism can be adjusted to a position below the supporting surface 1 so that the surface 1 can be used as a storage table or the like without interference from the belt drive and support mechanism. The distance between the lower run 8 of the belt 2 and the supporting surface 1 may be adjusted to accommodate workpieces of varying diameters by loosening the clamping levers 17, 18 for sliding the rail 19 up or down, and then tightening the clamping levers 17, 18. This makes it possible to positively grip workpieces of varying diameters between the lower belt run 8 and the supporting surface 1.

The tension of the belt 2 is adjustable by adjusting the distance between the rollers 6 and 7. This can be done in many different ways, and in the arrangement shown the front part of the plate 13 supporting the roller 6 is horizontally adjustable relative to the part of the plate 13 holding the roller 7 by virtue of the horizontally elongated slots 11, 12 receiving nut and bolt assemblies, or other fastener assemblies.

The lower belt run 8 is guided in a straight path by guide rails 9 and side support members 10 running along the opposite side edges of the lower belt run 8.

A lifting device 41 is provided for moving a workpiece 3 from an input station on roller table 4 into an inlet opening between the lower belt run 8 and the supporting surface 1. The workpiece 3 then is positively gripped between the lower belt run 8 and the supporting surface 1. The belt 2 is driven in a direction for movement of the lower belt run 8 from left to right in FIG. 1 so that rotation is imparted to the workpiece for rolling same along the supporting surface 1 from left to right in FIG. 1. An output station for the workpiece is generally indicated by the roller table 5. Frictional engagement of the lower belt run 8 with the workpiece imparts positive rotation to the workpiece for rolling same along the supporting surface 1. The workpiece is preferably engaged adjacent only one end thereof by the lower belt run 8.

An apparatus of the type described in FIG. 1 positively rotates a workpiece along the entire supporting surface 1 between the input and output stations defined by the roller tables 4, 5. The workpiece is positively gripped and rotated at all times along the entire supporting surface.

Figure 2:
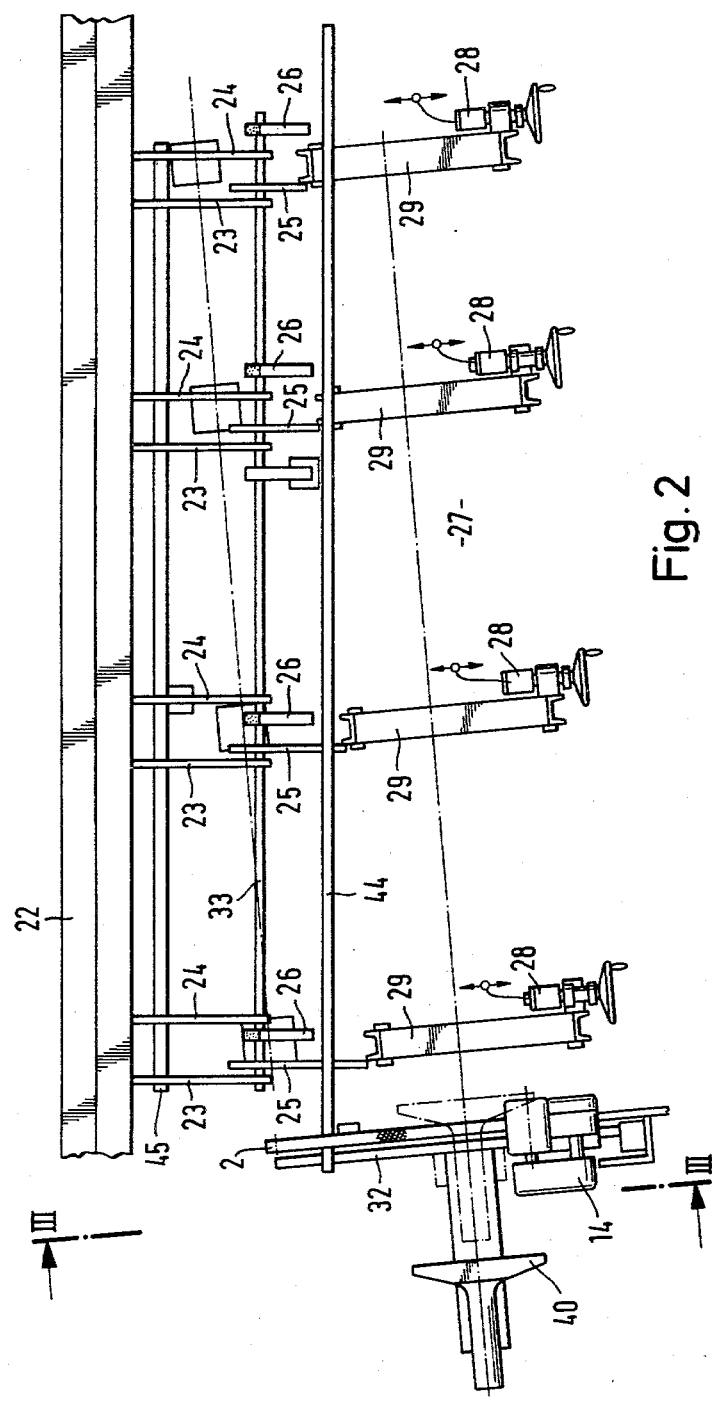
FIG. 2 is a plan view of another form of apparatus for transporting workpieces.
Figure 3:
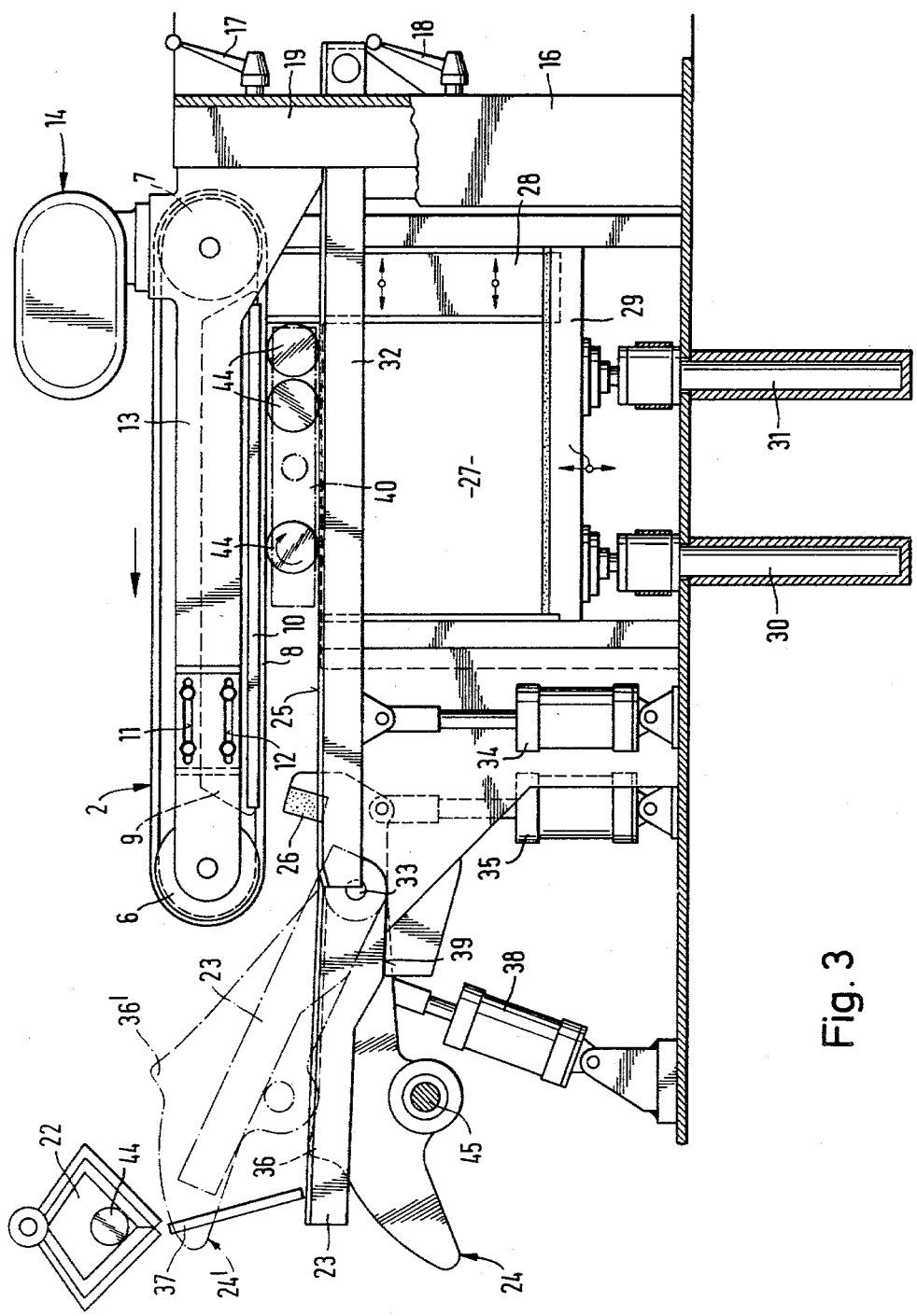
FIG. 3 is an end elevational view taken generally on line III—III of FIG. 2.

The workpieces travel in a direction generally perpendicular to their longitudinal axes. A workpiece transporting apparatus of the type described in FIG. 1 can be used with a collecting and stacking trough as generally indicated in FIGS. 2 and 3.

Elongated generally cylindrical workpieces, such as pipes or rods, are fed axially to a channel 22. One workpiece is generally indicated at 44. The channel 22 can be opened for releasing the workpiece 44 for downward movement along a deflector 37 and across movable levers 23, 24 defining a roll away slope toward stop 26. Relatively short supporting surfaces 25 are provided adjacent stops 26.

A workpiece receiving trough has at least one horizontally adjustable sidewall member 28 for varying the width of the trough 27, and a vertically adjustable bottom 29 for adjusting the depth of the trough 27. Pusher means 40 is indicated in FIG. 2 and reciprocates between the solid and shadow line positions. Pusher means 40 is generally aligned with the longitudinal axis of the trough 27, and moves generally parallel to such axis and to the longitudinal axis of a workpiece received in the trough 27. The pusher means 40 engages an end of a workpiece for aligning the corresponding ends of a plurality of workpieces positioned in the trough 27. The pusher means 40 also displaces the workpieces longitudinally from between the belt 2 and a lower support member 32.

The trough bottom 29 is raised by lifting elements 30, 31 to a height corresponding to the degree to which the trough 27 is filled with workpieces. The trough bottom 29 is raised to a position such that either it, or the upper surfaces of the workpieces in a workpiece layer supported thereon, will be substantially flush with the supporting surfaces 25 and the support member 32. For clarity of illustration, the bottom of the trough is lowered in FIG. 3 and would normally be at a higher elevation when there are no workpieces positioned thereon. The trough 27 receives a plurality of layers of workpieces, with each layer defined by a plurality of side-by-side workpieces. The movable sidewall member 28 is horizontally adjusted for closely receiving a predetermined number of workpieces in each layer depending upon the workpiece diameter.

As best shown in FIG. 2, the longitudinal axis of the trough 27 extends at an angle between 5°–10° to the longitudinal axis of a workpiece 44 positioned at the input station against the stops 26. That is, the open end of the space between the belt 2 and the supporting surfaces 25 adjacent the stops 26 generally defines an input station, while the trough 27 generally defines an output station. Workpieces entering the input station adjacent the stops 26 have their axes inclined at an angle of between 5°–10° with respect to the longitudinal axis of the trough 27.

The workpiece transporting mechanism is positioned beyond one end of the trough 27 as shown in FIG. 2. The elongated belt 2 extends generally perpendicular to the longitudinal trough axis. A support member 32 is positioned adjacent the belt 2 and is spaced below the lower belt run is substantially parallel relationship thereto. The support member 32 is also laterally offset slightly relative to the belt 2 as shown in FIG. 2. The support member 32 preferably has its upper surface spaced slightly above the supporting surfaces 25, and is pivotally connected adjacent the column 43 for swinging movement toward and away from the lower run of the belt 2. The free end of the support member 32 adjacent the input end is biased upwardly by a cylinder 34 for biasing a workpiece against the lower belt run. This maintains a workpiece firmly gripped between the belt 2 and the support member 32 while the workpiece is moved from the input station to the output station.

Movable stops 26 are positioned below the lower run of the belt 2 and the support member 32. Stops 26 are spaced laterally of the supporting surfaces 25 as shown in FIG. 2. Levers 23, 24 are mounted for pivotal movement independently of one another about axis 33, and stops 26 also pivot about the axis 33 independently of the levers 23, 24. Stops 26 are raised and lowered by cylinders 35, and may be lowered below the supporting surfaces 25. The levers 24 are all connected by rod 45 for movement in unison by operation of a fluid cylinder 38. The rod 45 engages the lower surfaces of the levers 23 for raising same during upward movement of the levers 24. During downward movement of the levers 24 by operation of the fluid cylinder 38, the levers 23 are stopped by an abutment 39 while the levers 24 continue moving downwardly. With the levers 23 resting against the stops 39, there is still a slight incline from left to right downwardly toward the stops 26.

Items 23, 24, 25 and 26 are all laterally spaced from one another and are also positioned in longitudinally-spaced groups as shown in FIG. 2. Items 28 and 29 are also laterally spaced from one another and are also positioned in longitudinally-spaced groups as shown in FIG. 2.

FIG. 4 shows an arrangement for moving the belt drive support mechanism out of the way below the workpiece supporting and transporting surface. An upper supporting column portion 16 is adapted to be pivoted about axis 42 relative to the main portion of the column. This allows the belt drive and support mechanism to be pivoted to the shadow line position shown in FIG. 4. where it is completely below the level of the supporting surface. The supporting surface 1 can then be used as a storage table or the like without interference from the workpiece transporting mechanism. FIG. 4 also shows the motor 14 as being drivingly connected with belt drive roller 7 as by a drive belt or chain.

In operation of the apparatus shown in FIGS. 2 and 3, a workpiece 44 moves axially from a processing machine into the channel 22. The channel 22 then opens for lowering the workpiece 44 onto the levers 24' which are in their raised shadow line position of FIG. 3. The workpiece comes to rest between the deflector 37 and an upwardly extending lug 36' on the levers 24. The levers 23, 24 are then lowered by operation of the cylinder 38 until the levers 23 hit the stops 39. Continued lowering of the levers 24 to positions with the lugs 36 below the levers 23 positions the workpiece on the levers 23 which are inclined downwardly to the right in FIG. 3. The workpiece then rolls down the levers 23 and along a portion of the supporting surfaces 25 to the stops 26. Just before reaching the stops 26, the workpiece is gripped by the conveyor belt 2 and the workpiece is pressed against the stops 26 at spaced intervals along the entire length of the workpiece. The stops 26 are then lowered by operation of the cylinder 35 for allowing the workpiece to continue rolling along a portion of the surfaces 25, and along the support member 32. The stops 26 are immediately raised for catching the next workpiece.

Trough bottom 29 is positioned in an elevated position until it or the upper surfaces of a completed workpiece layer lies flush with the supporting surfaces 25. Therefore, the workpiece rolls generally obliquely across the supporting surfaces 25 and along the support member 32. The workpiece runs off the supporting surfaces 25 and then rolls along the trough bottom 29 or along the upper surfaces of a completed workpiece layer supported on the trough bottom 29. The workpiece then strikes the trough sidewall member 28 at the opposite end of the trough 27 from the belt 2 and rotates in place against that sidewall member while swinging generally about that same sidewall member until the workpiece is bearing against all of the sidewall members 28 at spaced intervals along the entire length of the workpiece. This swinging movement of the workpieces places lateral forces on the belt 2 which are resisted by the guides 9, 10. The next workpiece in each layer strikes against the previous workpiece in a location remote from the belt 2 and then swings into position against the previous workpiece along the entire length thereof. This operation is continued until a complete layer of workpieces is built up.

The angle of inclination of the trough longitudinal axis with respect to the longitudinal axis of an incoming workpiece allows the workpiece to roll over the upper surfaces of a completed layer of workpieces already supported in the trough without casing the transported workpiece to fall into the gap between two adjacent workpieces in a completed layer. Thus, a new workpiece smoothly rolls across the top of a completed workpiece layer until one end of the workpiece strikes a single sidewall member 28 whereupon the workpiece swings across the lower layer until it strikes all of the sidewall support members 28.

A plurality of workpieces may be transported between the belt 2 and the support member 32 to form a complete layer of workpieces if so desired. The cylinder 34 is then operated for lowering the support member 32 while the pusher 40 of FIG. 2 is operated to engage the ends of the workpieces and move the workpieces longitudinally for displacing the ends beyond the support member 32 so the workpieces are supported only on the trough bottom 29 or a completed workpiece layer. The trough bottom wall 29 may be lowered simultaneously with operation of the pusher 40 so that the new layer of workpieces will fall between the trough sidewall members. In the alternative, each individual workpiece arriving at the output station may be deposited in the trough 27 by lowering the support member 32 and operating the pusher 40 to engage the end of the workpiece and move same beyond the support member 32. After backward movement of the pusher 40 from the shadow line position of FIG. 2 to the solid line position, the support member 32 is again raised for rolling transport of another workpiece to the output station. This sequence is repeated until the trough 27 is completely full.

Where the workpieces are individually pushed from the support member 32, it would be possible for the workpieces so pushed in a second layer to roll into the grooves between adjacent workpieces in a first layer already resting on the trough bottom 29. Where this is undesirable, it is possible to use small stacking elements to prevent a workpiece in an upper layer from rolling into the groove between adjacent workpieces in a lower layer. It is also possible to use friction retaining means or other retaining devices to retain the workpieces in their proper positions until a layer is completed. Such devices can also be used when a complete workpiece layer is fed between the belt 2 and the support member 32 before it is pushed into the trough.

The support member 32 has its upper surface slightly above the supporting surfaces 25, and slightly above either the trough bottom 29 or the top surfaces of a workpiece layer resting thereon, in order that workpieces which are slightly longitudinally curved will be rotatably transported without difficulty.

Once a workpiece layer is on the trough bottom 29, the bottom wall 29 is lowered until the first workpiece layer has its top surfaces substantially flush with the supporting surfaces 25.

The sidewall members 28 are individually adjustable so there is no obstruction between the sidewall members as would be the case if the sidewall members were adjusted in unison by a single shaft or the like. The bundle of workpieces in the trough 27 is thereby easily accessible for strapping or the like. Front trough sidewall members are positioned generally opposite from adjustable members 28 and are shorter to allow the workpieces to pass thereover. The members 28 extend well above the supporting surfaces 25 and the support member 32.

It will be recognized that it is also possible to incline the trough bottom downwardly toward the sidewall members 28 in order to maintain the workpieces in proper position as they are deposited in the trough. That is, each workpiece in each layer would then be held by the force of gravity toward the sidewall members 28 and this would prevent workpieces in an upper layer from rolling into a groove between adjacent workpieces in a lower layer.

The continuous belt 2 effectively defines a workpiece rotating means for engaging an elongated workpiece along a short portion of its length adjacent one end thereof for maintaining the workpiece in engagement with the supporting surface while positively rotating same along the surface. The upwardly and downwardly movable support member 32 defines a movable support means forming part of the support surface along which workpieces are rolled. In the arrangement shown, the support member 32 is a pivoted beam. However, it will be recognized that many other similar support means could be used for the purpose explained. The flexible belt 2 contacts each workpiece with essentially line contact or engages same over a short arc for frictionally imparting rotation to the workpiece and positively rolling same along the entire length of the support member 32. The belt 2 extends across the entire width of the trough 27 and across at least part of the supporting surfaces 25 leading up to the trough.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications which fall within the true spirit and scope of the invention.

What is claimed is:

1. Apparatus for transporting elongated generally cylindrical workpieces comprising: a workpiece supporting surface along which elongated generally cylindrical workpieces are rollable, an elongated flexible belt having an elongated lower belt run spaced above said supporting surface and extending therealong substantially parallel thereto, said belt being positioned adjacent one end of said supporting surface and having a relatively narrow width for engaging a workpiece over a short portion of its length adjacent one end thereof, and belt drive means for driving said belt, whereby workpieces gripped between said supporting surface and said lower belt run are rolled along said supporting surface by action of said belt.

2. The apparatus of claim 1 including adjusting means for adjusting said belt toward and away from said supporting surface to accommodate workpieces of different diameters.

3. The apparatus of claim 1 wherein said belt is on a supporting mechanism pivotally mounted adjacent one end of said supporting surface for swinging movement below said supporting surface so that said supporting surface can be used for other purposes without interference from said supporting mechanism.

4. The apparatus of claim 1 wherein said supporting surface includes an elongated movable support member positioned adjacent said lower belt run and spaced therebelow, and said support member being movable toward and away from said lower belt run.

5. The apparatus of claim 4 wherein said support member and said lower belt run have an input opening therebetween at one end of said support member, and said support member being pivoted adjacent its opposite end for swinging movement toward and away from said lower belt run.

6. The apparatus of claim 1 including input and output stations between which workpieces are transported, and end pusher means positioned adjacent said output station for movement generally parallel to the axis of an elongated generally cylindrical workpiece into engagement with one end of the workpiece to align the ends of a plurality of such workpieces at said output station.

7. The apparatus of claim 1 including a relatively narrow elongated support member positioned adjacent said lower belt run and displaced laterally therefrom on the opposite side thereof from said supporting surface, said support member being spaced below said lower belt run for gripping and rolling transport of workpieces between said support member and supporting surface on the one hand and said lower belt run on the other hand.

8. The apparatus of claim 7 wherein said support member has an upper surface spaced slightly above said supporting surface.

9. The apparatus of claim 1 including input and output stations between which workpieces are transported, a workpiece receiving trough adjacent said output station, and pusher means adjacent said output station for engaging an end of a workpiece and pushing same laterally of said lower belt run into said trough.

10. The apparatus of claim 9 wherein said trough has a longitudinal trough axis inclined at a small angle to the axis of a workpiece entering said input station.

11. Apparatus for transporting elongated generally cylindrical workpieces comprising: a workpiece supporting surface along which elongated generally cylindrical workpieces are rollable, an elongated flexible belt having an elongated lower belt run spaced laterally beyond one end of said supporting surface, said lower belt run being spaced above said supporting surface and extending substantially parallel thereto, said belt having a relatively narrow width for engaging a workpiece over a short portion of its length adjacent one end thereof, belt drive means for driving said belt, a narrow elongated support member positioned adjacent said lower belt run and spaced therebelow for rolling transport along said supporting surface of elongated generally cylindrical workpieces gripped between said lower belt run and said support member, and pusher means movable transversely of said support member for engaging said one end of a workpiece and pushing same from said support member.

12. Apparatus for transporting elongated generally cylindrical workpieces comprising: input and output stations between which workpieces are transported, a workpiece supporting surface along which elongated generally cylindrical workpieces are rollable between said input and output stations, an elongated flexible belt having an elongated lower belt run spaced above said supporting surface and extending therealong substantially parallel thereto between said input and output stations, belt drive means for driving said belt in a direction for moving said lower belt run in a direction from said input station to said output station, said supporting surface including a relatively narrow elongated support member positioned adjacent said lower belt run and spaced therebelow for gripping and rolling transport of workpieces between said support member and said lower belt run, a workpiece receiving trough at said output station having a trough axis inclined at an angle between 5°–10° to the axis of a workpiece entering said input station, and pusher means movable transversely of said support member and belt for engaging the end of a workpiece and pushing same into said trough from between said support member and said lower belt run.

13. The apparatus of claim 2 wherein said lower belt run extends substantially perpendicular to said trough axis.

* * * * *